(12) United States Patent
Takechi

(10) Patent No.: US 10,602,730 B2
(45) Date of Patent: Mar. 31, 2020

(54) DUAL-BEARING REEL

(71) Applicant: Shimano Inc., Sakai, Osaka (JP)

(72) Inventor: Kunio Takechi, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 123 days.

(21) Appl. No.: 15/941,272

(22) Filed: Mar. 30, 2018

(65) Prior Publication Data

US 2018/0368378 A1 Dec. 27, 2018

(30) Foreign Application Priority Data

Jun. 23, 2017 (JP) ................................. 2017-123506
Nov. 28, 2017 (JP) ................................. 2017-227995

(51) Int. Cl.
*A01K 89/01* (2006.01)
*A01K 89/033* (2006.01)

(52) U.S. Cl.
CPC .................................. *A01K 89/046* (2015.05)

(58) Field of Classification Search
CPC .. A01K 89/0155; A01K 89/046; A01K 89/05; A01K 89/057; A01K 89/058; A01K 89/059
See application file for complete search history.

(56) References Cited

U.S. PATENT DOCUMENTS

| | | | | |
|---|---|---|---|---|
| 5,875,986 A * | 3/1999 | Miyazaki | ............ | A01K 89/0155 242/261 |
| 6,209,816 B1 * | 4/2001 | Hitomi | ................. | A01K 89/015 242/322 |
| 6,371,396 B1 * | 4/2002 | Kawasaki | ........ | A01K 89/01557 242/289 |
| 2015/0129701 A1 * | 5/2015 | Takechi | ............... | A01K 89/033 242/268 |
| 2016/0345558 A1 * | 12/2016 | Niitsuma | ............ | A01K 89/0155 |
| 2016/0345559 A1 * | 12/2016 | Ikuta | ................... | A01K 89/0187 |
| 2017/0245484 A1 * | 8/2017 | Takechi | ............. | A01K 89/0188 |
| 2018/0064083 A1 * | 3/2018 | Ikuta | .................. | A01K 89/0155 |
| 2018/0332835 A1 * | 11/2018 | Takechi | ............... | A01K 89/046 |
| 2018/0343842 A1 * | 12/2018 | Misseri | ................ | A01K 89/046 |

FOREIGN PATENT DOCUMENTS

| JP | H09275861 A | 10/1997 |
|---|---|---|
| JP | 2016220547 A | 12/2016 |

* cited by examiner

*Primary Examiner* — Emmanuel M Marcelo
(74) *Attorney, Agent, or Firm* — United IP Counselors, LLC

(57) ABSTRACT

A dual-bearing reel includes a regulating member, a fixation member and an operating lever. The regulating member includes a flange part. The operating lever includes a through hole penetrated by the regulating member. The operating lever is attached to the regulating member and interposed between the flange part and the fixation member. Additionally, the through hole has a minor axis and a major axis. One of the regulating member and the operating lever includes at least one engaging recess that is aligned in a circumferential direction and is opened in a radial direction. The other of the regulating member and the operating lever includes an engaging protrusion to be engaged with the at least one engaging recess. The engaging protrusion and the at least one engaging recess are set in an engaged state or a disengaged state by moving the operating lever in a direction of the major axis.

16 Claims, 13 Drawing Sheets

DUAL-BEARING REEL

CROSS-REFERENCE TO RELATED APPLICATIONS

This application claims priority to Japanese Patent Applications No. 2017-123506 filed on Jun. 23, 2017 and No. 2017-227995 filed on Nov. 28, 2017, the entirety of which is hereby incorporated by reference in its entirety.

BACKGROUND

Technical Field

The present disclosure relates to a dual-bearing reel.

Background Information

Dual-bearing reels generally include a casting control mechanism. The casting control mechanism is a mechanism that regulates the rotation of a spool. For example, the casting control mechanism regulates the rotation of the spool in a clutch-off state by applying a friction force to a spool shaft unitarily rotated with the spool. By applying the friction force to the spool shaft, the rotational velocity of the spool is suppressed in releasing a fishing line, and occurrence of backlash is prevented.

In a dual-bearing reel described in Japan Laid-open Patent Application Publication No. H09-275861, an operating lever is pivotably attached to a reel unit so as to easily operate a casting control mechanism. A braking force to be applied to a spool shaft can be regulated by pivoting the operating lever in a circumferential direction.

On the other hand, Japan Laid-open Patent Application Publication No. 2016-220547 discloses a configuration regarding a regulating member and an operating lever in FIG. 15. The regulating member is attached to a reel unit so as to regulate a braking force to be applied to a spool shaft, and the operating lever is detachably attached to the regulating member. In this configuration, the operating lever is attached to the regulating member, and is then fixed thereto by fastening a nut member. When the nut member is then loosened and the operating lever is rotated with respect to the regulating member, it is possible to adjust an angle at which the operating lever is attached to the regulating member.

In the dual-bearing reel described above, at least one engaging protrusion provided on the operating lever is engaged with engaging recesses provided on the regulating member, whereby the operating lever is prevented as reliably as possible from rotating relatively to the regulating member. In this configuration, when the attachment angle of the operating lever is adjusted, the operating lever is moved in an axial direction so as to disengage the at least one engaging protrusion from the engaging recesses. Then, the nut member is sufficiently loosened to move the operating lever in the axial direction. In view of the above, there has been a demand for adjusting the attachment angle of the operating lever as easily as possible.

BRIEF SUMMARY

It is an object of the present disclosure to provide a dual-bearing reel in which an attachment angle of an operating lever can be easily adjusted.

A dual-bearing reel according to an aspect of the present disclosure includes a first reel body, a second reel body, a spool, a brake mechanism, a regulating member, a fixation member and an operating lever. The first reel body and the second reel body are disposed at an interval from each other. The spool is disposed between the first reel body and the second reel body. The brake mechanism is configured to brake rotation of the spool. The regulating member has a tubular shape and includes a flange part extending radially outward from an outer peripheral surface thereof. Additionally, the regulating member is attached to the first reel body, and is configured to regulate a braking force to be applied by the brake mechanism. The fixation member is screwed onto the regulating member. The operating lever includes a through hole penetrated by the regulating member. Additionally, the operating lever is attached to the regulating member and interposed between the flange part and the fixation member. The through hole of the operating lever has a minor axis and a major axis. One of the regulating member and the operating lever includes at least one engaging recess that is aligned in a circumferential direction and is opened in a radial direction. The other of the regulating member and the operating lever includes an engaging protrusion configured to be engaged with the at least one engaging recess. The engaging protrusion and the at least one engaging recess are set in an engaged state or a disengaged state by moving the operating lever in a direction of the major axis.

According to this configuration, the through hole of the operating lever has the major axis and the minor axis. Additionally, the at least one engaging recess is opened in the radial direction. Therefore, the engaging protrusion and the at least one engaging recess can be disengaged from each other by moving the operating lever not in an axial direction but in the direction of the major axis. In other words, the engaging protrusion and the at least one engaging recess can be disengaged by loosening the fixation member to the extent that the operating lever is movable in the radial direction. Therefore, an attachment angle of the operating lever is easily adjustable.

Preferably, the one of the regulating member and the operating lever includes a body member and a positioning member that is non-rotatably attached to the body member. Additionally, the at least one engaging recess is provided on the positioning member. For example, the regulating member includes the body member and the positioning member. Additionally, the at least one engaging recess is provided on an outer peripheral surface of the positioning member.

Preferably, the at least one engaging recess is provided on an outer peripheral surface of the flange part of the regulating member.

Preferably, the at least one engaging recess is made in a shape of a groove extending in an axial direction.

Preferably, the engaging protrusion is provided on the operating lever.

Preferably, the engaging protrusion is disposed outside the through hole in the direction of the major axis of the through hole.

Preferably, the engaging protrusion protrudes in the axial direction.

Preferably, the regulating member includes a screw part on the outer peripheral surface thereof. Additionally, the fixation member is a nut member to be screwed onto the screw part.

Preferably, the dual-bearing reel further includes a restriction portion. The restriction portion restricts the operating lever from moving in the direction of the major axis. According to this configuration, even when an operating force is applied in such a direction as to disengage the engaging protrusion and the at least one engaging recess, the operating lever is not moved in the direction of the major axis. Hence, the engaging protrusion and the at least one engaging recess can be prevented from being disengaged from each other against the intention of an angler. It should be noted that the restriction portion restricts the operating lever from moving in the direction of the major axis, while this restriction can be released. When the fixation member is loosened, it is possible to release the state in which the restriction portion restricts the operating lever from moving in the direction of the major axis.

Preferably, the operating lever includes a first cylindrical part that is disposed to surround the through hole and protrudes toward the fixation member. The fixation member includes a second cylindrical part that protrudes toward the operating lever. The restriction portion is composed of the first cylindrical part and the second cylindrical part. An inner peripheral surface of the second cylindrical part makes contact with an outer peripheral surface of the first cylindrical part. According to this configuration, the operating lever is restricted from moving in the direction of the major axis by the contact between the first cylindrical part and the second cylindrical part. Hence, the engaging protrusion and the at least one engaging recess can be prevented from being disengaged from each other against the intention of the angler.

Preferably, the operating lever includes a first cylindrical part that is disposed to surround the through hole and protrudes toward the fixation member. The restriction portion is composed of the first cylindrical part. An inner peripheral surface of the first cylindrical part makes contact with an outer peripheral surface of the fixation member. According to this configuration, the operating lever is restricted from moving in the direction of the major axis by the contact between the inner peripheral surface of the first cylindrical part and the outer peripheral surface of the fixation member. Hence, the engaging protrusion and the at least one engaging recess can be prevented from being disengaged from each other against the intention of the angler. It should be noted that preferably, the fixation member can be composed of the first cylindrical part and a second cylindrical part. The second cylindrical part protrudes toward the operating lever. The restriction portion is also composed of the second cylindrical part. The inner peripheral surface of the first cylindrical part makes contact with an outer peripheral surface of the second cylindrical part. According to this configuration, the operating lever is restricted from moving in the direction of the major axis by the contact between the inner peripheral surface of the first cylindrical part and the outer peripheral surface of the second cylindrical part. Hence, the engaging protrusion and the at least one engaging recess can be prevented from being disengaged from each other against the intention of the angler.

Preferably, the operating lever includes a first cylindrical part that is disposed to surround the through hole and protrudes toward the flange part. The restriction portion is composed of the first cylindrical part. An inner peripheral surface of the first cylindrical part makes contact with the outer peripheral surface of the flange part. According to this configuration, the operating lever is restricted from moving in the direction of the major axis by the contact between the inner peripheral surface of the first cylindrical part and the outer peripheral surface of the flange part. Hence, the engaging protrusion and the at least one engaging recess can be prevented from being disengaged from each other against the intention of the angler.

Overall, according to the present disclosure, the attachment angle of the operating lever is easily adjustable.

BRIEF DESCRIPTION OF THE DRAWINGS

Referring now to the attached drawings which form a part of this original disclosure.

DETAILED DESCRIPTION OF EMBODIMENTS

A preferred embodiment of a dual-bearing reel according to the present disclosure will be hereinafter explained with reference to the attached drawings. It should be noted that in the following explanation, the term "axial direction" indicates an extending direction of a rotational axis of a spool. Additionally, the term "radial direction" indicates a radial direction of an imaginary circle about the rotational axis of the spool, whereas the term "circumferential direction" indicates a circumferential direction of the imaginary circle about the rotational axis of the spool.

<Dual-Bearing Reel>

Figure 1:
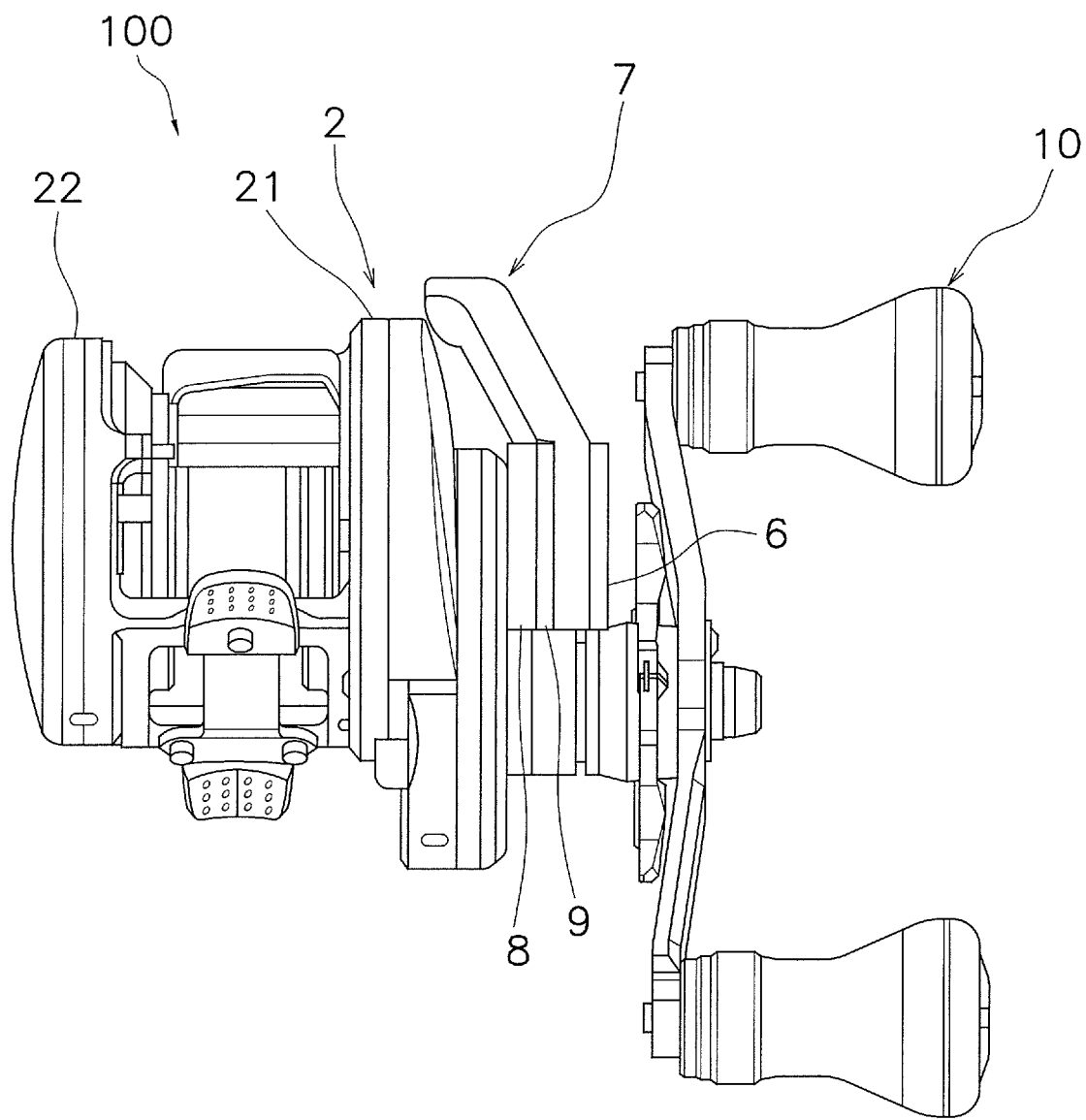
FIG. 1 is a rear view of a dual-bearing reel.
Figure 2:
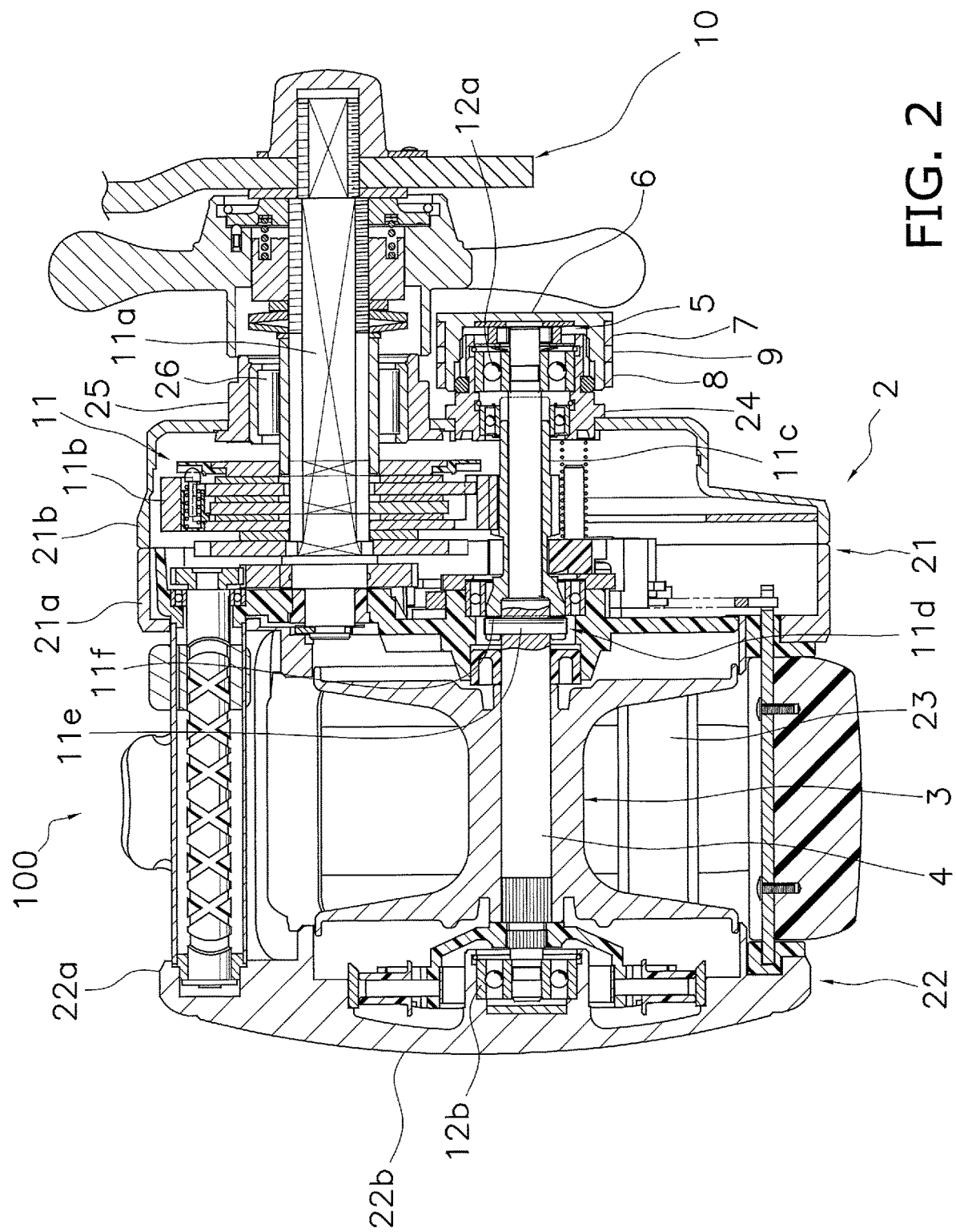
FIG. 2 is a cross-sectional view of the dual-bearing reel.

As shown in FIGS. 1 and 2, a dual-bearing reel 100 includes a reel unit 2, a spool 3, a spool shaft 4, a brake mechanism 5, a regulating member 6, an operating lever 7 and a nut member 8.

<Reel Unit>

The reel unit 2 includes a first reel body 21 and a second reel body 22. The first reel body 21 and the second reel body 22 are disposed at an interval in the axial direction. The first reel body 21 and the second reel body 22 are coupled to each other through a plurality of coupling parts 23.

As shown in FIG. 2, the first reel body 21 includes a first side plate 21a and a first cover 21b. The first reel body 21 includes an accommodation space in the interior thereof. The accommodation space accommodates a rotation transmission mechanism 11 and so forth. The second reel body 22 includes a second side plate 22a and a second cover 22b. The first side plate 21a and the second side plate 22a are coupled to each other through the coupling parts 23. The first side plate 21a, the second side plate 22a and the coupling parts 23 are integrally formed and compose the frame of the reel unit 2.

The first reel body 21 further includes a first boss part 24 and a second boss part 25. The first boss part 24 and the second boss part 25 are disposed at an interval from each other. Each of the first and second boss parts 24 and 25 has a cylindrical shape and protrudes outward in the axial direction. Detailedly, each of the first and second boss parts 24 and 25 protrudes outward from the first cover 21b in the axial direction.

Figure 3:
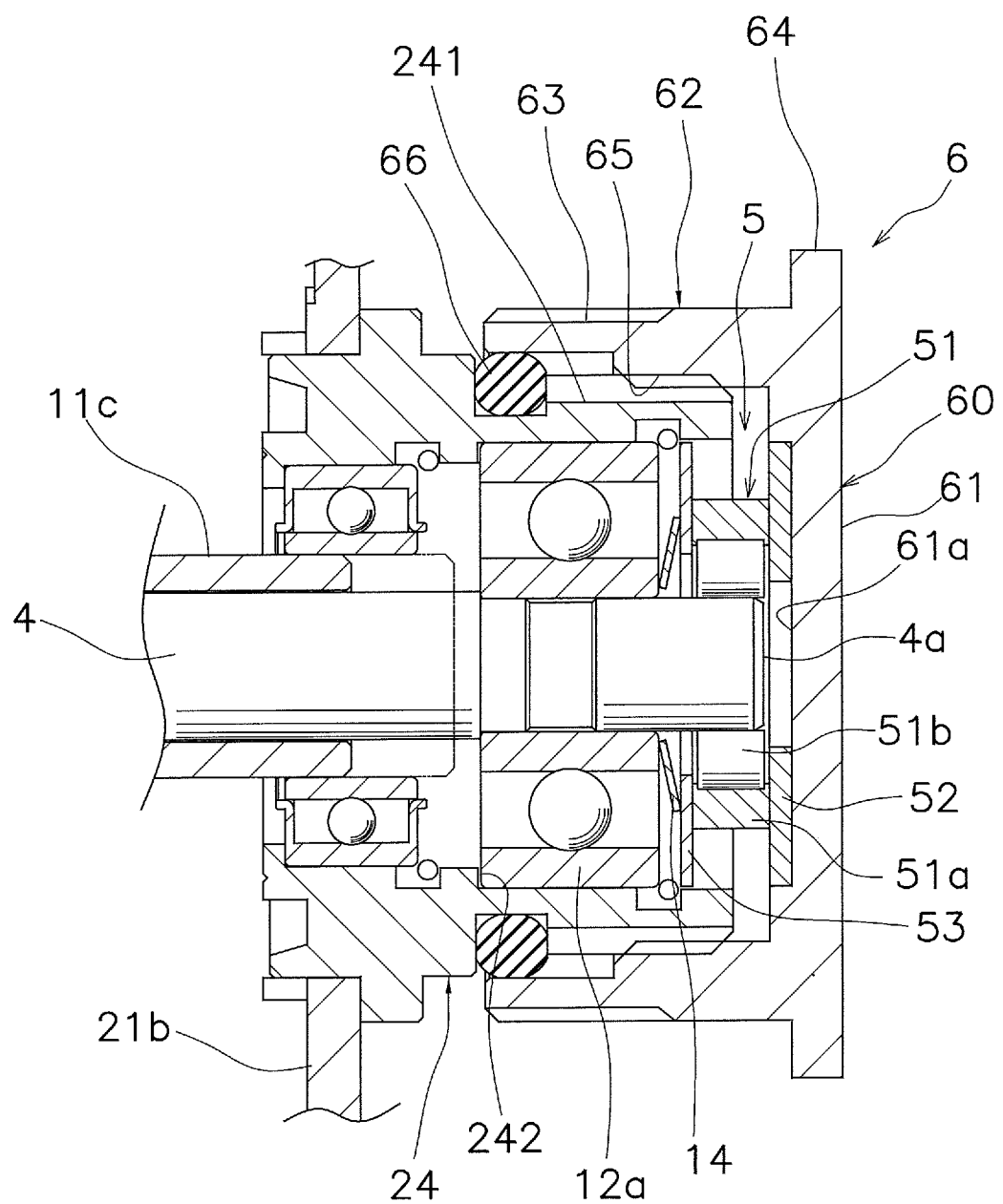
FIG. 3 is an enlarged cross-sectional view of the dual-bearing reel.

The first boss part 24 includes a screw part 241 on the outer peripheral surface thereof (see FIG. 3). The regulating member 6 is attached to the first boss part 24. Detailedly, the regulating member 6 is screwed onto the first boss part 24. The second boss part 25 is disposed at an interval from the first boss part 24. Therefore, the second boss part 25 is disposed at an interval from the regulating member 6 attached to the first boss part 24.

The accommodation space of the first reel body 21 and the outside are communicated through the first and second boss parts 24 and 25. One end of the spool shaft 4 is rotatably supported inside the first boss part 24. On the other hand, a drive shaft 11a is supported inside the second boss part 25 through a one-way clutch 26 so as to be rotatable in a fishing line winding direction.

<Spool>

The spool 3 is disposed between the first reel body 21 and the second reel body 22. Detailedly, the spool 3 has an approximately cylindrical shape and extends in the axial direction. The spool 3 is rotatable with respect to the reel unit 2. The spool 3 is rotatably supported by the reel unit 2 through the spool shaft 4.

<Spool Shaft>

The spool shaft 4 is unitarily rotated with the spool 3. The spool shaft 4 is rotatably supported by the first and second reel bodies 21 and 22. It should be noted that the spool shaft 4 is rotatably supported by the first and second reel bodies 21 and 22 through first and second bearing members 12a and 12b.

<Handle>

A handle 10 is a member for rotating the spool shaft 4, and is rotatably attached to the first reel body 21. When the handle 10 is rotated, the spool shaft 4 is rotated through the rotation transmission mechanism 11.

<Rotation Transmission Mechanism>

The rotation transmission mechanism 11 is a mechanism that transmits the rotation of the handle 10 to the spool shaft 4. The rotation transmission mechanism 11 includes the drive shaft 11a, a drive gear 11b, a pinion gear 11c and a clutch mechanism 11d. The drive shaft 11a is unitarily rotated with the handle 10. The drive gear 11b is unitarily rotated with the drive shaft 11a. The pinion gear 11c is meshed with the drive gear 11b. The pinion gear 11c has a tubular shape, and the spool shaft 4 penetrates the interior of the pinion gear 11c.

The clutch mechanism 11d is configured to allow or block transmitting the rotation of the pinion gear 11c to the spool shaft 4. The clutch mechanism 11d can be set in a clutch-off state and a clutch-on state. The spool 3 is made freely rotatable in the clutch-off state of the clutch mechanism 11d, whereas the spool 3 becomes able to wind the fishing line in the clutch-on state of the clutch mechanism 11d. Specifically, the clutch mechanism 11d is composed of an engaging pin 11e and an engaging recess 11f. The engaging pin 11e penetrates the spool shaft 4 in the radial direction. The engaging recess 11f is a recess provided on one end of the pinion gear 11c.

When the clutch mechanism 11d is set in the clutch-on state, the engaging pin 11e is engaged with the engaging recess 11f. As a result, the rotation of the pinion gear 11c is transmitted to the spool shaft 4, whereby the spool 3 becomes able to wind the fishing line. On the other hand, when the clutch mechanism 11d is set in the clutch-off state, the pinion gear 11c is moved in a direction separating from the engaging pin 11e, whereby the engaging pin 11e and the engaging recess 11f are disengaged from each other. As a result, the rotation of the pinion gear 11c is not transmitted to the spool shaft 4, whereby the spool 3 becomes freely rotatable.

<Brake Mechanism>

The brake mechanism 5 is configured to brake the rotation of the spool 3. Detailedly, the spool shaft 4 is unitarily rotated with the spool 3. Hence, the brake mechanism 5 is configured to brake the rotation of the spool 3 by braking the rotation of the spool shaft 4. Thus, the brake mechanism 5 is an example of a means for braking a rotation of the spool 3. It should be noted that in the present preferred embodiment, the brake mechanism 5 is configured to brake the fishing line releasing directional rotation of the spool shaft 4. As shown in FIG. 3, the brake mechanism 5 includes a one-way clutch 51, a first friction plate 52 and a second friction plate 53.

The one-way clutch 51 is attached to the spool shaft 4. The one-way clutch 51 includes an outer race 51a and a plurality of rolling elements 51b. The outer race 51a is rotatable with respect to the reel unit 2. Detailedly, the outer race 51a is rotatable with respect to the first boss part 24. The outer race 51a is disposed at a gap from the inner peripheral surface of the first boss part 24.

The outer race 51a is axially interposed and held between the first friction plate 52 and the second friction plate 53. In other words, the rotation of the outer race 51a is braked by the first and second friction plates 52 and 53.

The rolling elements 51b are disposed between the spool shaft 4 and the outer race 51a. The rolling elements 51b transmit the fishing line releasing directional rotation of the spool shaft 4 to the outer race 51a. On the other hand, the rolling elements 51b do not transmit the fishing line winding directional rotation of the spool shaft 4 to the outer race 51a.

The first friction plate 52 is disposed between the outer race 51a of the one-way clutch 51 and a disc part 61 of the regulating member 6. The first friction plate 52 is an annular plate and makes contact with the outer race 51a. It should be noted that the first friction plate 52 makes contact with the outer race 51a but does not make contact with the rolling elements 51b. The first friction plate 52 is made of, for instance, carbon cloth. The disc part 61 of the regulating member 6 axially presses the outer race 51a through the first friction plate 52.

The second friction plate 53 has an annular shape and makes contact with the outer race 51a of the one-way clutch 51. The outer race 51a is interposed between the first friction plate 52 and the second friction plate 53. It should be noted that the second friction plate 53 does not make contact with the rolling elements 51b.

<Urging Member>

An urging member 14 urges the outer race 51a of the one-way clutch 51 toward the disc part 61 of the regulating member 6. In other words, the urging member 14 urges the outer race 51a so as to prevent the outer race 51a from being separated from the first friction plate 52. It should be noted that the urging member 14 urges the outer race 51a through the second friction plate 53.

The urging member 14 is restricted from axially moving away from the one-way clutch 51. Specifically, the urging member 14 is supported by the first bearing member 12a. The first bearing member 12a is restricted from moving away from the one-way clutch 51 by a step part 242 provided on the inner peripheral surface of the first boss part 24.

The urging member 14 is, for instance, a disc spring. The outer peripheral part of the urging member 14 urges the outer race 51*a* of the one-way clutch 51 through the second friction plate 53. On the other hand, the inner peripheral part of the urging member 14 is supported by the inner race of the first bearing member 12*a*. Even when the urging member 14 is completely compressed, an end surface 4*a* of the spool shaft 4 does not make contact with a bottom surface 61*a* of the regulating member 6.

<Regulating Member>

The regulating member 6 is attached to the first boss part 24 of the first reel body 21. The regulating member 6 has a cylindrical shape. Detailedly, the regulating member 6 includes the disc part 61 and a tubular part 62 that axially extends from the outer peripheral end of the disc part 61.

Additionally, the regulating member 6 includes a screw part 63 and a flange part 64. The screw part 63 is provided on the outer peripheral surface of the tubular part 62. The flange part 64 radially extends from the outer peripheral surface of the tubular part 62.

The regulating member 6 also includes a screw part 65 provided on the inner peripheral surface of the tubular part 62. The screw part 65 is screwed onto the screw part 241 provided on the outer peripheral surface of the first boss part 24 of the reel unit 2. Therefore, the regulating member 6 is moved in the axial direction when rotated about the rotational axis of the spool shaft 4.

The regulating member 6 is capable of regulating the braking force for braking the rotation of the spool shaft 4. In other words, the regulating member 6 is capable of regulating the braking force applied by the brake mechanism 5. Thus, the regulating member 6 is an example of a means for regulating the braking force to be applied by the brake mechanism 5. It should be noted that in the present preferred embodiment, the spool shaft 4 and the outer race 51*a* are rotated in conjunction with each other when the spool shaft 4 is rotated in the fishing line releasing direction. Therefore, the regulating member 6 is capable of regulating the braking force for braking the rotation of the spool shaft 4 by regulating the braking force for braking the rotation of the outer race 51*a*. Specifically, when the regulating member 6 is rotated to be moved in the axial direction, the force of the regulating member 6 pressing the outer race 51*a* can be regulated, whereby the braking force for braking the outer race 51*a* can be regulated. It should be noted that the regulating member 6 presses the outer race 51*a* through the first friction plate 52.

A seal member 66 is disposed between the inner peripheral surface of the regulating member 6 and the outer peripheral surface of the first boss part 24. The seal member 66 can prevent foreign objects from intruding into the interior of the reel unit 2. Additionally, the seal member 66 applies rotational resistance to the regulating member 6 so as to prevent a situation that the regulating member 6 is rotated against the intention of an angler.

Figure 4:
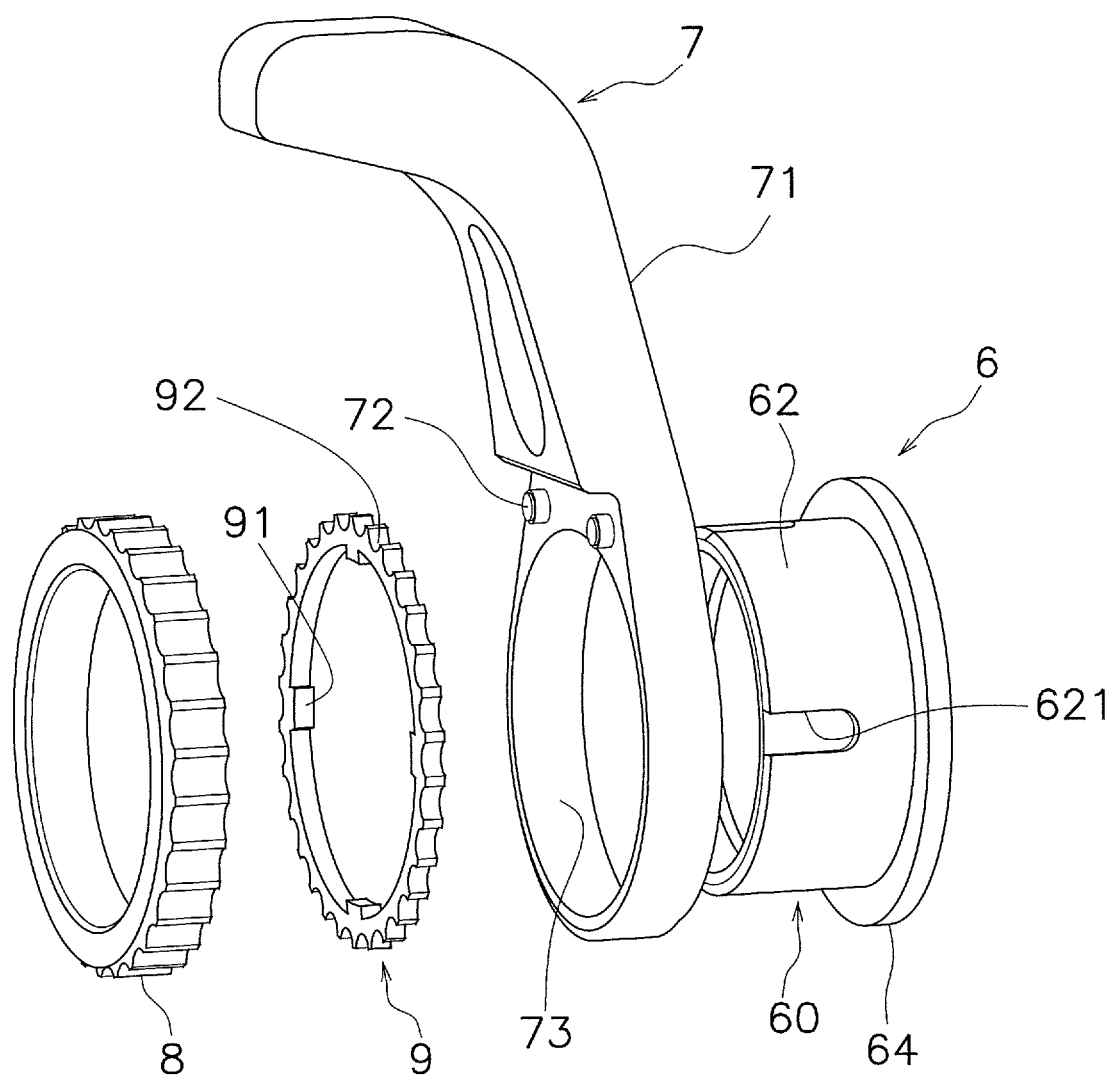
FIG. 4 is an exploded perspective view of a casting control mechanism.

As shown in FIG. 4, the regulating member 6 includes a body member 60 and a positioning member 9. The body member 60 and the positioning member 9 are provided as members separated from each other. It should be noted that the body member 60 includes the aforementioned parts such as the disc part 61 and the tubular part 62.

The positioning member 9 is non-rotatably attached to the body member 60. Detailedly, the positioning member 9 has a cylindrical shape. The inner diameter of the positioning member 9 is approximately equal to the outer diameter of the tubular part 62 of the regulating member 6.

The positioning member 9 includes keys 91 provided on the inner peripheral surface thereof. The keys 91 are engaged with key grooves 621 provided on the outer peripheral surface of the tubular part 62 of the body member 60. As a result, the positioning member 9 is non-rotatably attached to the body member 60. In other words, the positioning member 9 is unitarily rotated with the body member 60. It should be noted that the positioning member 9 is axially slidable against the body member 60.

Additionally, the positioning member 9 includes a plurality of engaging recesses 92 aligned in the circumferential direction. The respective engaging recesses 92 are provided on the outer peripheral surface of the positioning member 9. Additionally, each engaging recess 92 is opened radially outward. Each engaging recess 92 is made in the shape of a groove extending in the axial direction. Additionally, each engaging recess 92 is made in the shape of a semicircle in a front view. Each of engaging protrusions 72 (to be described) is engaged with any one of the plural engaging recesses 92. It should be noted that the inner wall surface of each engaging recess 92 is shaped to fit along the outer peripheral surface of each engaging protrusion 72.

<Nut Member>

The nut member 8 (an exemplary fixation member) is configured to be screwed onto the regulating member 6. Detailedly, the nut member 8 includes a screw part on the inner peripheral surface thereof, and the screw part is screwed onto the screw part 63 of the regulating member 6. The nut member 8 fixes the operating lever 7 to the regulating member 6, while interposing the operating lever 7 between the nut member 8 and the flange part 64 of the regulating member 6. Likewise, the nut member 8 also fixes the positioning member 9 to the regulating member 6. Thus, the nut member 8 is an example of a means for fixing the operating lever 7 and the positioning member 9 to the regulating member 6. In other words, the operating lever 7 and the positioning member 9 are interposed between the nut member 8 and the flange part 64.

The nut member 8 is disposed between the operating lever 7 and the first reel body 21. In more detail, the nut member 8 is disposed between the positioning member 9 and the first reel body 21. In other words, the nut member 8, the positioning member 9, the operating lever 7, and the flange part 64 of the regulating member 6 are aligned in this order from the first reel body 21 side.

<Operating Lever>

The operating lever 7 is detachably attached to the regulating member 6. Detailedly, the operating lever 7 is interposed between the nut member 8 and the flange part 64 of the regulating member 6, and is thereby attached to the regulating member 6.

The operating lever 7 is disposed to be pivotable in the circumferential direction. It should be noted that the operating lever 7 is unitarily rotated with the regulating member 6. Specifically, when the operating lever 7 is pivoted, the regulating member 6 is rotated about the rotational axis of the spool shaft 4.

The operating lever 7 includes an operating lever body 71, a pair of engaging protrusions 72 and a through hole 73. The operating lever body 71 extends from the regulating member 6 in the radial direction. Additionally, the operating lever body 71 extends toward the second reel body 22. Specifically, the operating lever body 71 is curved and bent such that the tip end thereof faces the first reel body 21. It should be noted that the distal end of the operating lever body 71 is an end far from the regulating member 6, whereas the base end of the operating lever body 71 is an end near to the regulating member 6.

Figure 5:
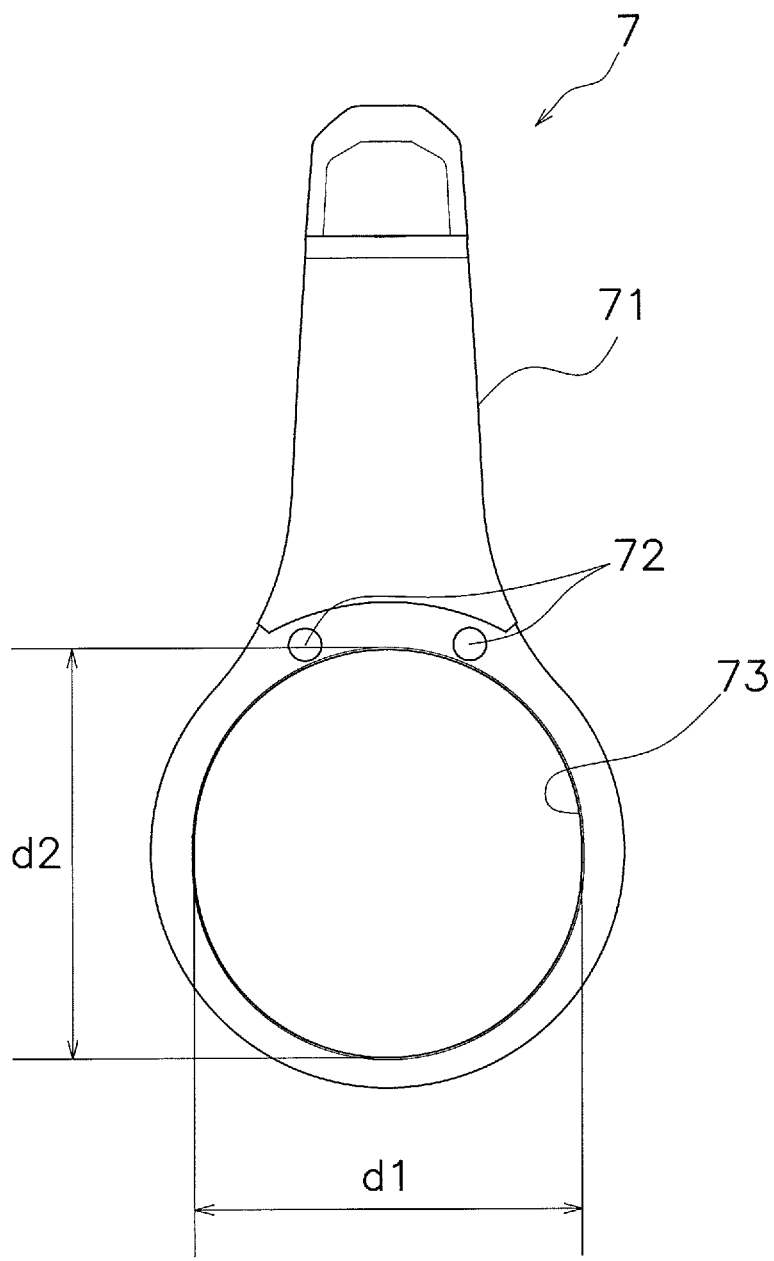
FIG. 5 is a front view of an operating lever.

As shown in FIG. 5, the operating lever body 71 includes the through hole 73 in a base end-side part thereof. The tubular part 62 of the regulating member 6 penetrates the through hole 73. The through hole 73 has a minor (traverse) axis and a major (lengthwise) axis. Specifically, the through hole 73 has an oval shape (a track shape, an elliptic shape, etc.) in a front view. The major axis of the through hole 73 extends along the lengthwise direction of the operating lever body 71 (the up-and-down direction in FIG. 5). On the other hand, the minor axis of the through hole 73 extends along the width direction of the operating lever body 71 (the right-and-left direction in FIG. 5).

Figure 6:
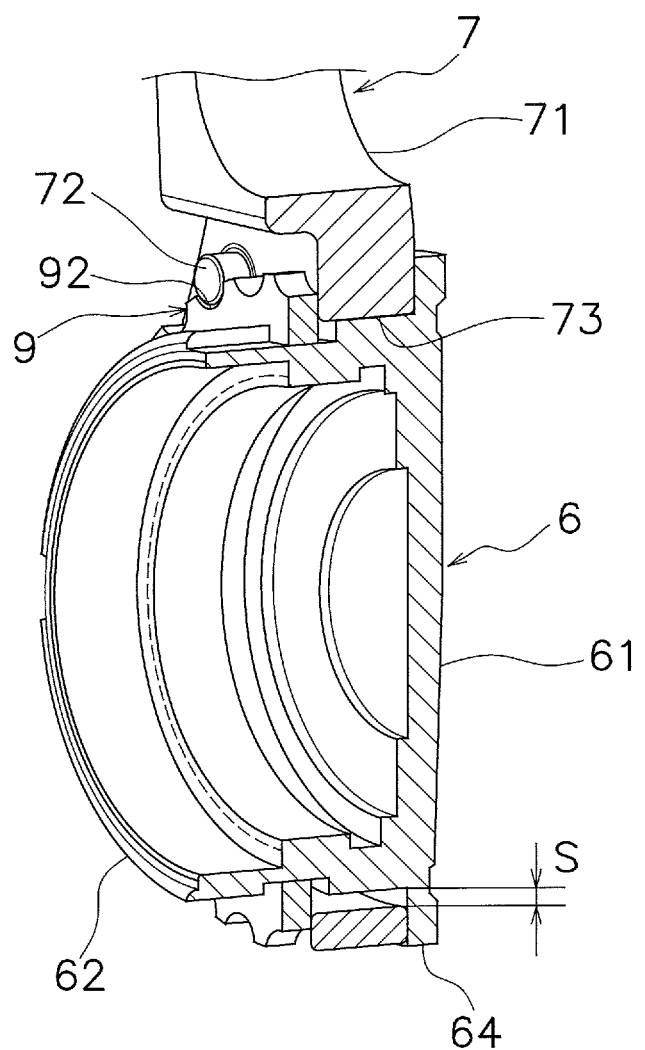
FIG. 6 is a cross-sectional view of an engaged state of engaging protrusions and engaging recesses.

The minor axis of the through hole 73 has a length d1 approximately equal to the outer diameter of the tubular part 62 of the regulating member 6. The major axis of the through hole 73 has a length d2 greater than the outer diameter of the tubular part 62 of the regulating member 6. Therefore, as shown in FIG. 6, a gap S is produced between the inner wall surface of the through hole 73 and the outer peripheral surface of the tubular part 62 in the major-axis direction of the through hole 73. The length of the gap S is preferably greater than the depth of each engaging recess 92, although not particularly limited to this.

Each engaging protrusion 72 protrudes from the operating lever body 71 in the axial direction. Detailedly, each engaging protrusion 72 protrudes from the operating lever body 71 toward the positioning member 9 in the axial direction. Each engaging protrusion 72 has a columnar shape. Additionally, each engaging protrusion 72 is configured to be engaged with one of the engaging recesses 92 of the positioning member 9. Each engaging protrusion 72 is disposed outside the through hole 73 in the major-axis direction of the through hole 73.

<Action of Dual-Bearing Reel>

Next, the action of the dual-bearing reel 100 will be explained. In casting to release the fishing line from the spool 3, the spool shaft 4 is rotated in the fishing line releasing direction. The fishing line releasing directional rotation of the spool shaft 4 is transmitted to the outer race 51a of the one-way clutch 51 through the rolling elements 51b, whereby the outer race 51a is rotated. The outer race 51a is pressed by the regulating member 6 through the first friction plate 52. In other words, the outer race 51a is braked by the brake mechanism 5. Hence, the rotational velocity of the spool shaft 4 unitarily rotated with the outer race 51a is suppressed. The spool shaft 4 and the spool 3 are actuated in conjunction with each other. Hence, the rotational velocity of the spool 3 is also suppressed in releasing the fishing line, whereby occurrence of backlash is prevented.

When the operating lever 7 is pivoted in the circumferential direction, the regulating member 6 is rotated and moved in the axial direction. Accordingly, the braking force to be applied by the brake mechanism 5 can be regulated. In other words, the braking force to be applied to the spool shaft 4 can be regulated by pivoting the operating lever 7 in the circumferential direction. It should be noted that the operating lever 7 can be operated by, for instance, a hand of the angler holding the second reel body 22.

In winding the fishing line, the spool shaft 4 is rotated in the fishing line winding direction. The rolling elements 51b do not transmit the fishing line winding directional rotation of the spool shaft 4 to the outer race 51a. In other words, the spool shaft 4 and the outer race 51a are not actuated in conjunction with each other, whereby the braking force applied by the brake mechanism 5 does not act on the spool shaft 4. Therefore, in winding the fishing line, rotational resistance is not generated in the spool shaft 4 by the brake mechanism 5, whereby the spool shaft 4 is smoothly rotatable.

In changing the attachment angle of the operating lever 7, the nut member 8 is firstly rotated and loosened. Here, the nut member 8 is not required to be loosened to the extent that the operating lever 7 is axially movable by the axial length of each engaging protrusion 72. The nut member 8 is only loosened to the extent that the operating lever 7 is radially movable.

Figure 7:
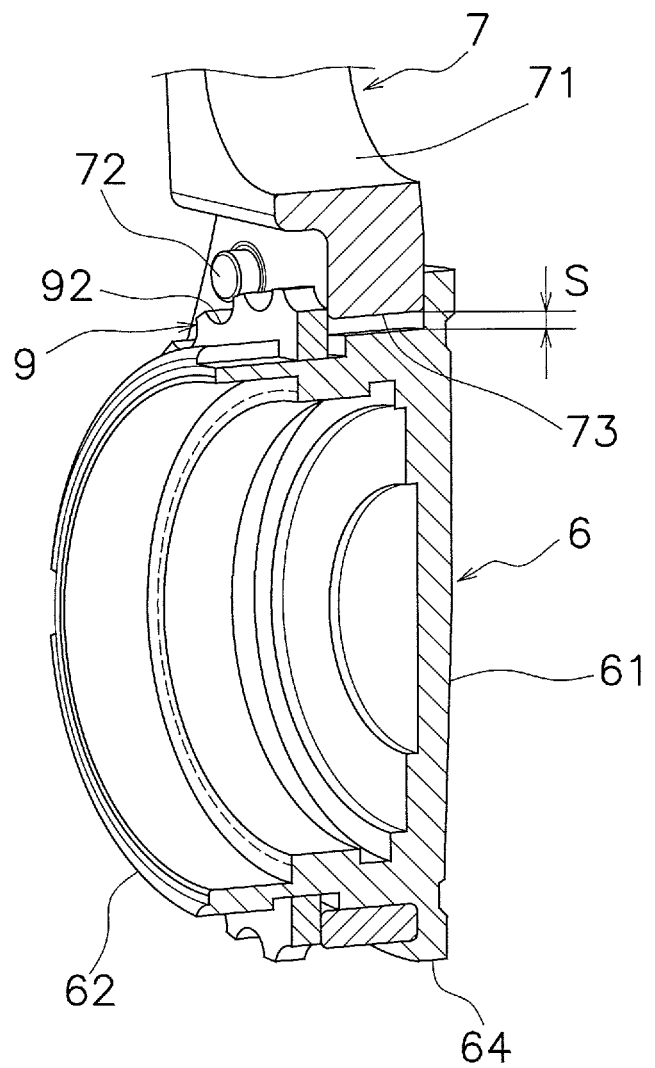
FIG. 7 is a cross-sectional view of a disengaged state of the engaging protrusions and the engaging recesses.

Next, as shown in FIG. 7, the operating lever 7 is moved in the major-axis direction of the through hole 73 such that the engaging protrusions 72 come out of the engaging recesses 92. The gap S shifts relative to FIG. 6. Thus, the engaging protrusions 72 and the engaging recesses 92 are set in a disengaged state by moving the operating lever 7 in the major-axis direction of the through hole 73. In the disengaged state, the engaging protrusions 72 and the engaging recesses 92 are not engaged with each other. Hence, the operating lever 7 is rotatable relatively to the regulating member 6.

Next, the operating lever 7 is rotated with respect to the regulating member 6 so as to be set in a desired attachment angle. Then, as shown in FIG. 6, the operating lever 7 is moved in the major-axis direction of the through hole 73 such that the engaging protrusions 72 are engaged with the engaging recesses 92. Thus, the engaging protrusions 72 and the engaging recesses 92 are set in an engaged state by moving the operating lever 7 in the major-axis direction of the through hole 73. It should be noted that in the engaged state, the engaging protrusions 72 and the engaging recesses 92 are engaged with each other. Hence, the operating lever 7 is non-rotatable relatively to the regulating member 6. Thus, the engaging protrusions 72 and the engaging recesses 92 are examples of means for preventing the operating lever 7 from rotating relatively to the regulating member 6. Thus, the engaging protrusions 72 and the engaging recesses 92 can be set in the engaged state or the disengaged state by moving the operating lever 7 in the major-axis direction of the through hole 73.

After the engaging protrusions 72 are engaged with the engaging recesses 92, the nut member 8 is screwed onto the regulating member 6. Accordingly, the operating lever 7 is fixed to the regulating member 6 while being interposed between the flange part 64 and the nut member 8.

One preferred embodiment of the present disclosure has been explained above. However, the present disclosure is not limited to the above, and a variety of changes can be made without departing from the gist of the present advancement.

Modification 1

Figure 8:
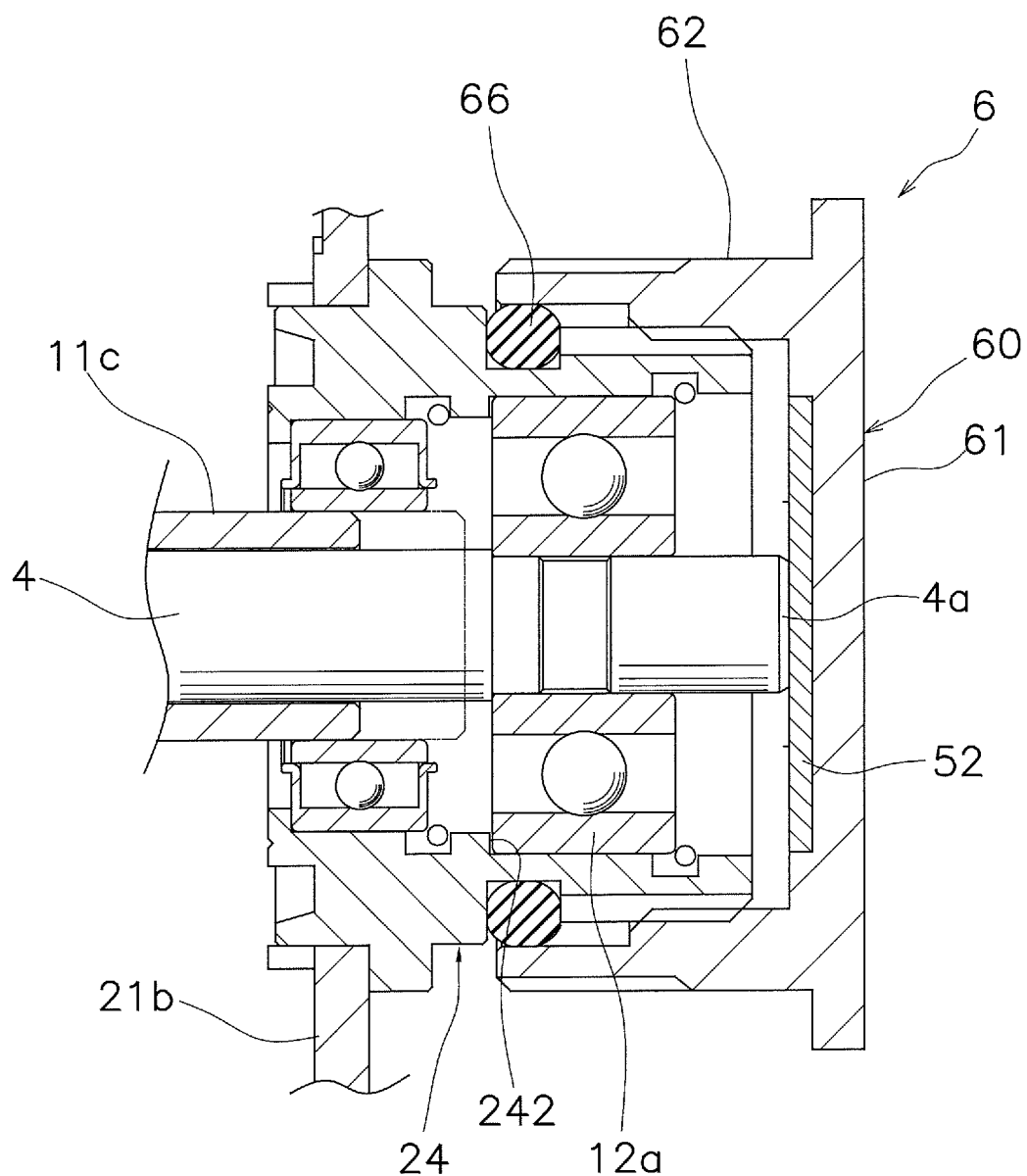
FIG. 8 is an enlarged cross-sectional view of a dual-bearing reel according to a modification.

In the aforementioned preferred embodiment, the brake mechanism 5 is composed of the one-way clutch 51, the first friction plate 52 and the second friction plate 53. However, the composition of the brake mechanism 5 is not particularly limited to this as long as the brake mechanism 5 is capable of braking the rotation of the spool shaft 4. For example, as shown in FIG. 8, the brake mechanism 5 can be composed of only the first friction plate 52. In other words, the brake mechanism 5 might not be provided with the one-way clutch 51 and the second friction plate 53. In this case, the first friction plate 52 makes contact with the end surface 4a of the spool shaft 4 and directly brakes the rotation of the spool shaft 4.

Alternatively, the brake mechanism 5 can be composed of the disc part 61 of the regulating member 6. In other words, the brake mechanism 5 might not be provided with the one-way clutch 51, the first friction plate 52 and the second friction plate 53. In this case, the disc part 61 makes contact with the end surface 4a of the spool shaft 4 and directly brakes the rotation of the spool shaft 4.

Modification 2

Figure 9:
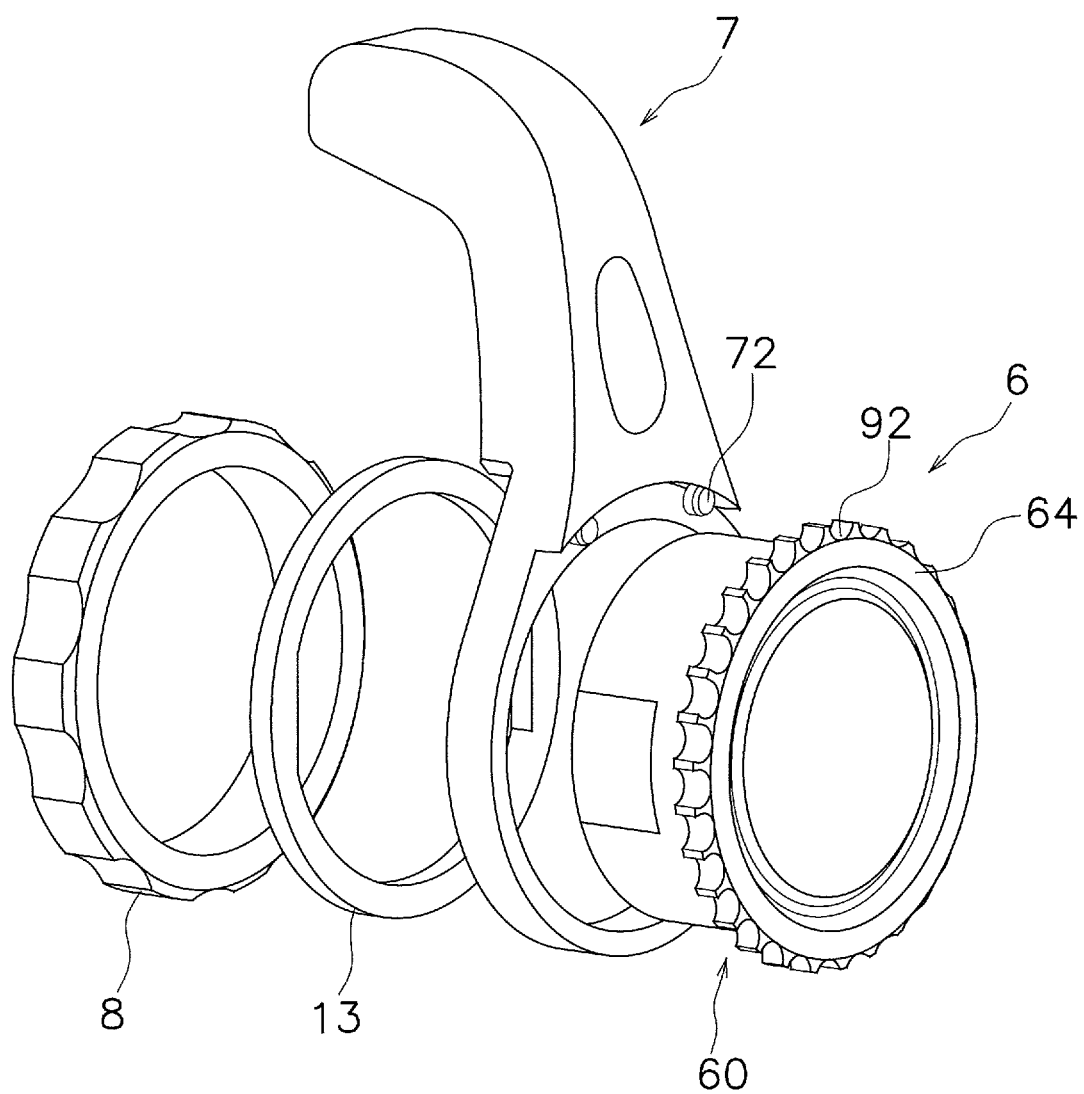
FIG. 9 is an exploded perspective view of a casting control mechanism according to another modification.

In the aforementioned preferred embodiment, the regulating member 6 includes the positioning member 9. However, the positioning member 9 can be omitted. Moreover, as shown in FIG. 9, the body member 60 of the regulating member 6 can include a plurality of engaging recesses 92. The engaging recesses 92 are aligned in the circumferential direction. Additionally, at least one engaging protrusion 72 of the operating lever 7 is engaged with at least any one of the plural engaging recesses 92 of the regulating member 6. The respective engaging recesses 92 are provided on, for instance, the outer peripheral surface of the flange part 64 of the regulating member 6. Moreover, the at least one engaging protrusion 72 extends from the operating lever body 71 toward the flange part 64 in the axial direction. Furthermore, a washer 13 can be disposed between the nut member 8 and the operating lever 7. The water 13 can be made of, for instance, resin.

Modification 3

In the aforementioned preferred embodiment, the nut member 8, the operating lever 7 and the flange part 64 are disposed in this order from the first reel body 21 side. However, the positional relation among these members is not limited to this. For example, the flange part 64, the operating lever 7 and the nut member 8 can be axially disposed in this order from the first reel body 21 side.

Modification 4

In the aforementioned preferred embodiment, the regulating member 6 includes the plural engaging recesses 92, whereas the operating lever 7 includes the engaging protrusions 72. However, the configurations of the regulating member 6 and the operating lever 7 are not limited to the above. For example, the regulating member 6 can include at least one engaging protrusion, whereas the operating lever 7 can include at least one engaging recess. For example, the operating lever 7 can be provided with a plurality of engaging recesses on the inner wall surface of the through hole 73. On the other hand, the regulating member 6 can include at least one engaging protrusion.

Modification 5

Figure 10:
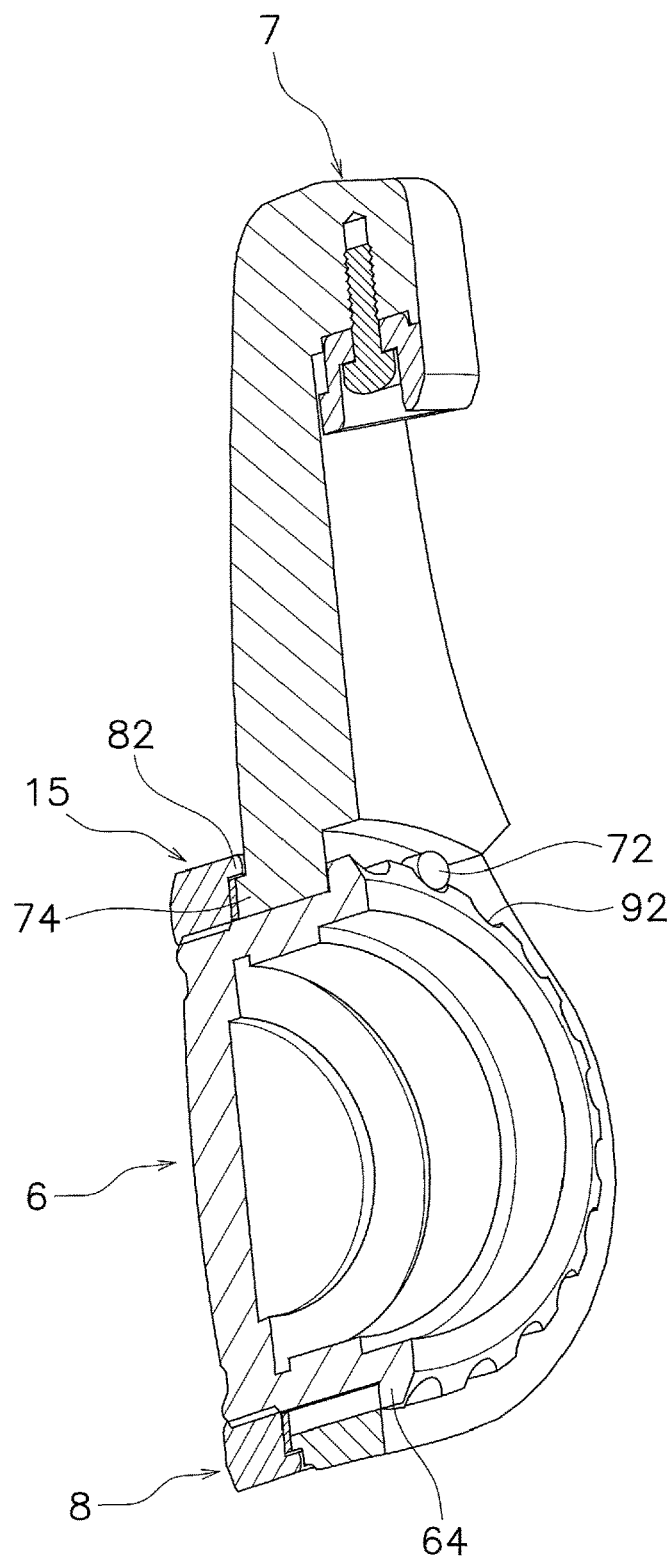
FIG. 10 is a cross-sectional perspective view of a restriction portion.
Figure 11:
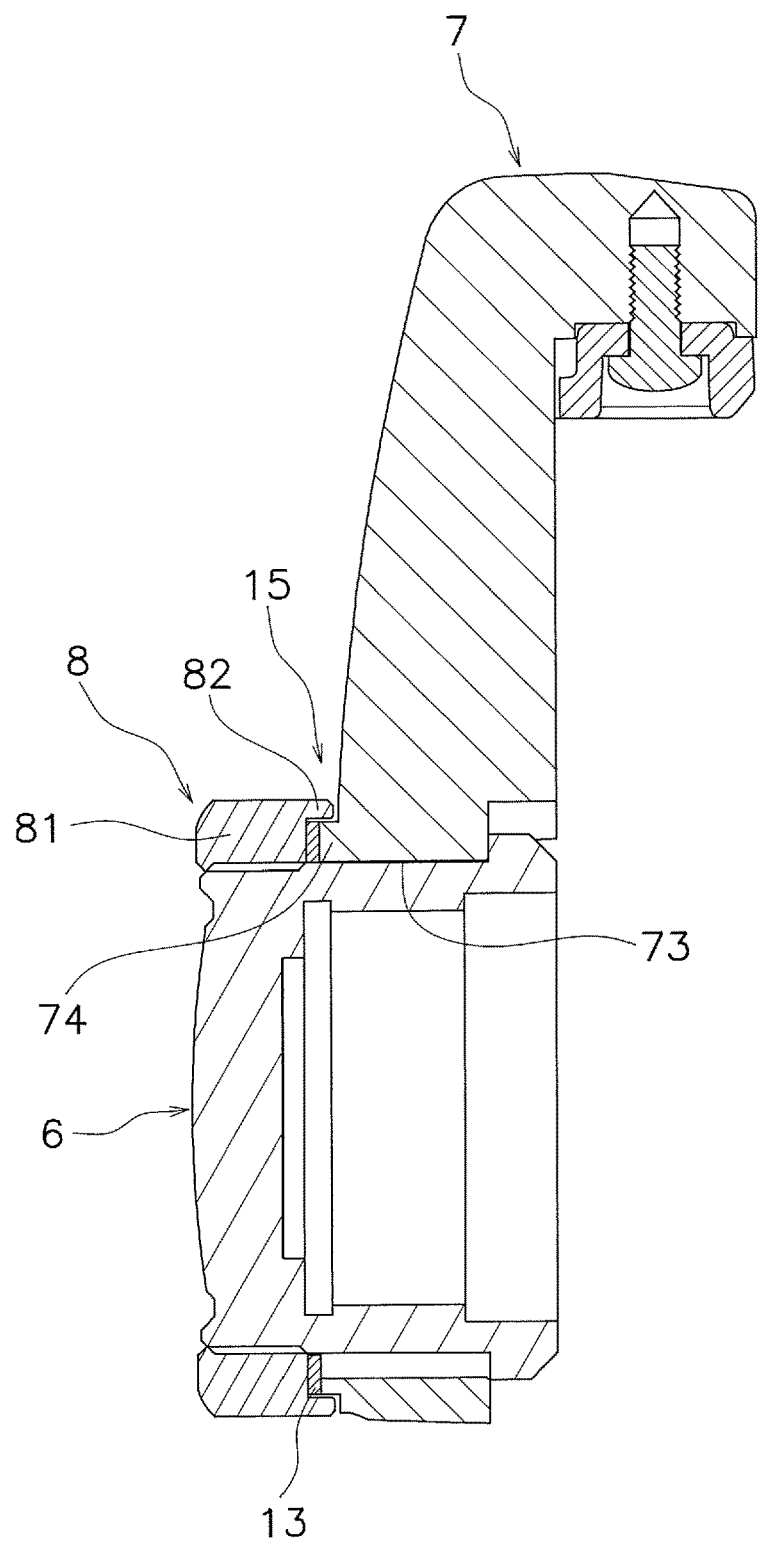
FIG. 11 is a cross-sectional view of the restriction portion.

The dual-bearing reel 100 can further include a restriction portion 15. The restriction portion 15 is configured to restrict the operating lever 7 from moving in the major-axis direction. Thus, the restriction portion 15 is an example of a means for restricting the operating lever 7 from moving in the direction of the major axis. For example, as shown in FIGS. 10 and 11, the restriction portion 15 can be composed of a first cylindrical part 74 and a second cylindrical part 82.

The first cylindrical part 74 is part of the operating lever 7. In other words, the operating lever 7 includes the first cylindrical part 74. The first cylindrical part 74 is disposed to surround the through hole 73. Additionally, the first cylindrical part 74 protrudes from the operating lever body 71 toward the nut member 8. It should be noted that the first cylindrical part 74 protrudes oppositely to at least one engaging protrusion 72.

The second cylindrical part 82 is part of the nut member 8. In other words, the nut member 8 includes a body 81 and the second cylindrical part 82. The second cylindrical part 82 protrudes from the body 81 toward the operating lever 7.

The second cylindrical part 82 is disposed outside the first cylindrical part 71 in the radial direction. The inner peripheral surface of the second cylindrical part 82 makes contact with the outer peripheral surface of the first cylindrical part 74. This contact prevents the operating lever 7 from moving in the major-axis direction. According to the configuration, even when an operating force is applied in such a direction as to disengage the at least one engaging protrusion 72 and at least one of the engaging recesses 92 from each other, the operating lever 7 is not moved in the major-axis direction. Hence, the at least one engaging protrusion 72 and the at least one of the engaging recesses 92 are prevented from being disengaged from each other. It should be noted that when the nut member 8 is loosened, the contact between the first cylindrical part 74 and the second cylindrical part 82 is released. This results in releasing the state that the restriction portion 15 restricts the operating lever 7 from moving in the major-axis direction.

Modification 6

Figure 12:
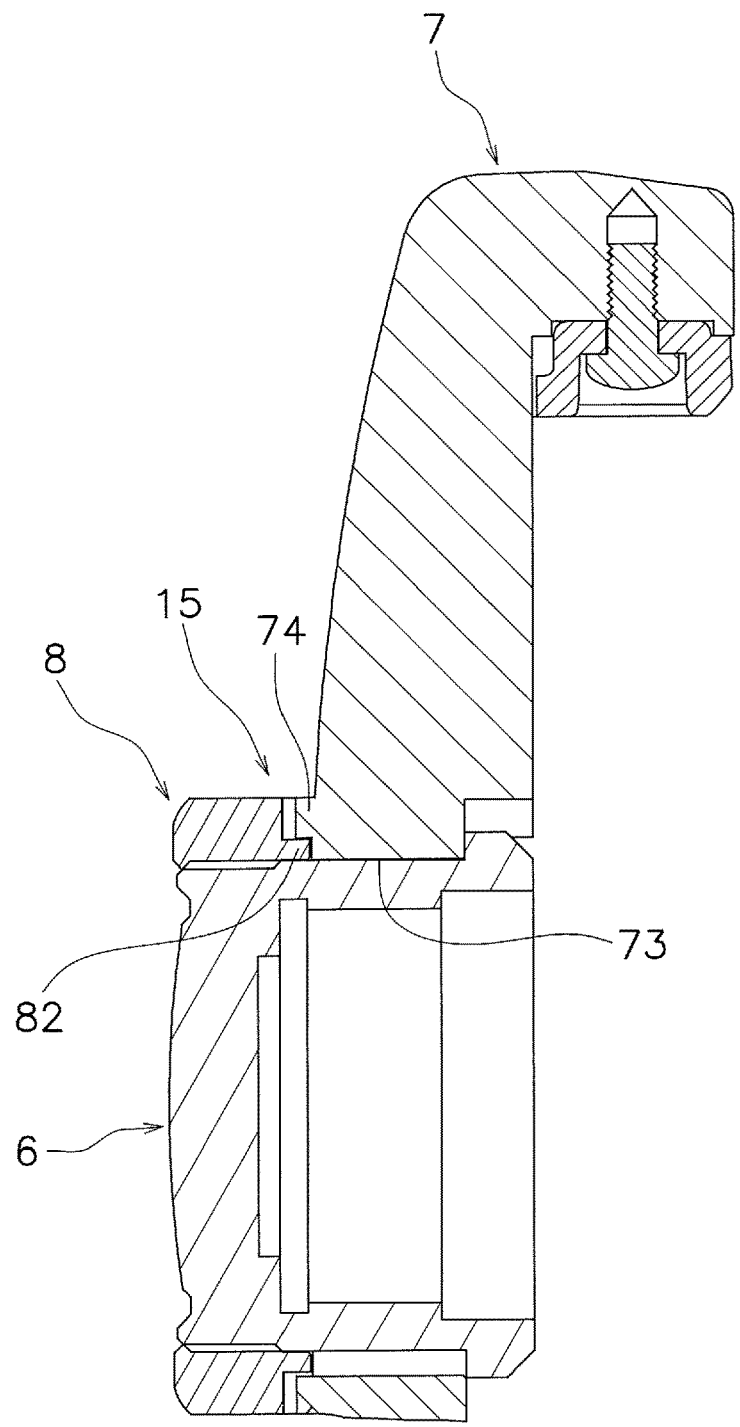
FIG. 12 is a cross-sectional view of another restriction portion.

In the aforementioned modification 5, the second cylindrical part 82 is disposed outside the first cylindrical part 74 in the radial direction. However, the positional relation between the first cylindrical part 74 and the second cylindrical part 82 is not limited to this. For example, as shown in FIG. 12, the second cylindrical part 82 can be disposed inside the first cylindrical part 74 in the radial direction. In this case, the outer peripheral surface of the second cylindrical part 82 makes contact with the inner peripheral surface of the first cylindrical part 74. It should be noted that the second cylindrical part 82 can be omitted, and herein, the inner peripheral surface of the first cylindrical part 74 can make contact with the outer peripheral surface of the nut member 8.

Modification 7

Figure 13:
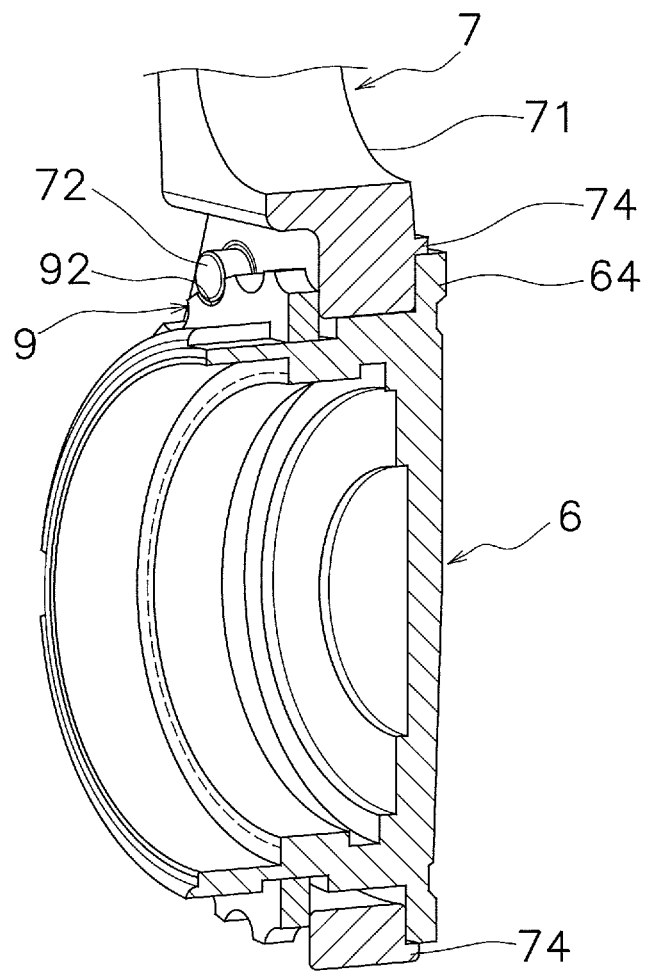
FIG. 13 is a cross-sectional perspective view of yet another restriction portion.

In the aforementioned modification 5, the first cylindrical part 74 protrudes toward the nut member 8. The configuration of the first cylindrical part 74 is not limited to this. For example, the first cylindrical part 74 can protrude toward the flange part 64. In this case, as shown in FIG. 13, the inner peripheral surface of the first cylindrical part 74 makes contact with the outer peripheral surface of the flange part 64.

What is claimed is:

1. A dual-bearing reel, comprising:
a first reel body;
a second reel body disposed at an interval from the first reel body;
a spool disposed between the first reel body and the second reel body;
a brake mechanism configured to brake a rotation of the spool;
a regulating member having a tubular shape, the regulating member including a flange part extending radially outward from an outer peripheral surface thereof, the regulating member attached to the first reel body, the regulating member configured to regulate a braking force to be applied by the brake mechanism;
a fixation member screwed onto the regulating member; and
an operating lever including a through hole penetrated by the regulating member, the operating lever attached to the regulating member and interposed between the flange part and the fixation member, wherein
the through hole has a minor axis and a major axis,
one of the regulating member and the operating lever includes at least one engaging recess, the at least one engaging recess aligned in a circumferential direction, the at least one engaging recess opened in a radial direction, the other of the regulating member and the operating lever includes an engaging protrusion, the engaging protrusion to be engaged with the at least one engaging recess, and the engaging protrusion and the at least one engaging recess are set in an engaged state or a disengaged state by moving the operating lever in a direction of the major axis.

2. The dual-bearing reel according to claim 1, wherein the one of the regulating member and the operating lever includes a body member and a positioning member, the positioning member non-rotatably attached to the body member, and the at least one engaging recess is provided on the positioning member.

3. The dual-bearing reel according to claim 2, wherein the regulating member includes the body member and the positioning member, and the at least one engaging recess is provided on an outer peripheral surface of the positioning member.

4. The dual-bearing reel according to claim 1, wherein the at least one engaging recess is provided on an outer peripheral surface of the flange part of the regulating member.

5. The dual-bearing reel according to claim 1, wherein the at least one engaging recess is made in a shape of a groove extending in an axial direction.

6. The dual-bearing reel according to claim 1, wherein the engaging protrusion is provided on the operating lever.

7. The dual-bearing reel according to claim 6, wherein the engaging protrusion is disposed outside the through hole in the direction of the major axis of the through hole.

8. The dual-bearing reel according to claim 1, wherein the engaging protrusion protrudes in an axial direction.

9. The dual-bearing reel according to claim 1, wherein the regulating member includes a screw part on the outer peripheral surface thereof, and the fixation member is a nut member to be screwed onto the screw part.

10. The dual-bearing reel according to claim 1, further comprising:

a restriction portion configured to restrict the operating lever from moving in the direction of the major axis.

11. The dual-bearing reel according to claim 10, wherein the operating lever includes a first cylindrical part, the first cylindrical part disposed to surround the through hole, the first cylindrical part protruding toward the fixation member, the fixation member includes a second cylindrical part, the second cylindrical part protruding toward the operating lever, the restriction portion includes the first cylindrical part and the second cylindrical part, and an inner peripheral surface of the second cylindrical part makes contact with an outer peripheral surface of the first cylindrical part.

12. The dual-bearing reel according to claim 10, wherein the operating lever includes a first cylindrical part, the first cylindrical part disposed to surround the through hole, the first cylindrical part protruding toward the fixation member, the restriction portion includes the first cylindrical part, and an inner peripheral surface of the first cylindrical part makes contact with an outer peripheral surface of the fixation member.

13. The dual-bearing reel according to claim 12, wherein the fixation member includes a second cylindrical part, the second cylindrical part protruding toward the operating lever, the restriction portion further includes the second cylindrical part, and the inner peripheral surface of the first cylindrical part makes contact with an outer peripheral surface of the second cylindrical part.

14. The dual-bearing reel according to claim 10, wherein the operating lever includes a first cylindrical part, the first cylindrical part disposed to surround the through hole, the first cylindrical part protruding toward the flange part, the restriction portion includes the first cylindrical part, and an inner peripheral surface of the first cylindrical part makes contact with an outer peripheral surface of the flange part.

15. A casting control mechanism for a dual-bearing reel, the casting control mechanism comprising:

a regulating member having a tubular shape, the regulating member including a flange part extending radially outward from an outer peripheral surface thereof, the regulating member configured to regulate a braking force to be applied by a brake mechanism;

a fixation member screwed onto the regulating member; and an operating lever including a through hole penetrated by the regulating member, the operating lever attached to the regulating member and interposed between the flange part and the fixation member, wherein the through hole has a minor axis and a major axis, one of the regulating member and the operating lever includes at least one engaging recess, the at least one engaging recess aligned in a circumferential direction, the at least one engaging recess opened in a radial direction, the other of the regulating member and the operating lever includes an engaging protrusion, the engaging protrusion to be engaged with the at least one engaging recess, and the engaging protrusion and the at least one engaging recess are set in an engaged state or a disengaged state by moving the operating lever in a direction of the major axis.

16. The casting control mechanism according to claim 15, wherein the one of the regulating member and the operating lever includes a body member and a positioning member, the positioning member non-rotatably attached to the body member, and the at least one engaging recess is provided on the positioning member.

* * * * *